UNITED STATES PATENT OFFICE 2,991,276
Patented July 4, 1961

2,991,276
CROSS-LINKED NITRILE POLYMERS AND
METHOD OF PREPARATION
Lawrence F. Arnold, Avon Lake, Ohio, assignor to The
B. F. Goodrich Company, New York, N.Y., a corporation of New York
No Drawing. Filed June 9, 1958, Ser. No. 740,565
12 Claims. (Cl. 260—85.5)

This invention relates to new and useful cross-linked acrylonitrile interpolymers and more particularly pertains to interpolymers of acrylonitrile and a polyalkenylated element selected from the group consisting of silicon, germanium, tin and lead and to methods for preparing the interpolymers in an aqueous system.

An object of this invention is to provide new and useful cross-linked nitrile interpolymers which, although insoluble in all solvents, are capable of swelling rapidly to a high degree in certain polar organic solvents. Another object of this invention is to provide a method for preparing the aforementioned insoluble cross-linked nitrile polymers. The accomplishment of these and other objects of this invention is disclosed in the following description and examples.

Copolymers of acrylonitrile and divinyl benzene have been discussed in the chemical literature (Faserfarsch U. Textiltech. 4, 454 (1953)). In general the acrylonitrile-divinyl benzene copolymers heretofore known are markedly inferior in thickening power in non-aqueous polar solvents when compared with the polymers of this invention.

I have discovered that copolymers of alpha-beta olefinically unsaturated nitriles such as acrylonitrile and methacrylonitrile and from about 0.05 to about 5 parts by weight based on the weight of acrylonitrile of a cross-linking agent comprising a polyalkenylated element of the group consisting of silicon, germanium, tin and lead are unusually efficient thickeners for polar organic solvents such as dimethyl formamide, dimethyl acetamide, gamma-butyrolactone, N-methyl pyrrolidone, dimethyl sulfoxide, tetrahydrofuran and the like.

As used herein the term "alpha-beta olefinically unsaturated nitrile" is defined to mean compounds having the structure

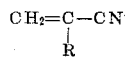

wherein R represents hydrogen; a halogen such as fluorine, chlorine, bromine and iodine; a cyano group; an aliphatic group having from 1 to 6 carbon atoms such as methyl, ethyl, propyl, butyl, amyl and hexyl; an aromatic hydrocarbon group such as phenyl; an alicyclic group such as cyclopentane and cyclohexane and the like and others.

The cross-linking agents embodied in this invention include compounds which conform to the structure

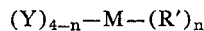

in which R' is an alkenyl group having from 2 to 4 carbon atoms with terminal unsaturation such as vinyl, allyl and methallyl and Y is a hydrocarbon group of from 1 to 10 carbon atoms having no olefinic unsaturation such as methyl, ethyl, propyl, butyl, amyl, hexyl, heptyl, octyl, nonyl, decyl, cyclopentyl, cyclohexyl, phenyl and naphthyl, n is a number of from 2 to 4 and M is a member of the group consisting of Si, Ge, Sn and Pb. The properties of the interpolymers vary depending upon the nature of the nitrile monomer, the nature of the cross-linking agent and the proportions of the cross-linking agent used in the polymerization recipe. The use of from about 0.05 to about 5% by weight of cross-linking agent in the interpolymer results in polymeric products which have the ability to imbibe large quantities of polar organic solvents with consequent many times increase in volume.

The polymers embodied in this invention are useful for preparing thickened gels in polar organic solvents, said gels in turn are useful as paint removers, and they are particularly useful for removing paint from vertical and overhead surfaces where the high viscosity and adhesive properties of said gel allow prolonged contact of the solvent with the paint film to be softened without the inconvenient dripping and running usually encountered with more fluid paint removers.

In the production of the polymers of this invention we use a monomeric mixture which contains two essential monomeric ingredients, each in certain proportions, one being an alpha-beta olefinically unsaturated nitrile and the other being a cross-linking agent as herein defined.

Representative alpha-beta olefinically unsaturated nitriles useful for preparing the cross-linked interpolymers of this invention include acrylonitrile, methacrylonitrile, vinylidene cyanide, alpha-cyano styrene, alpha-chloro acrylonitrile and the like. The preferred alpha-beta olefinically unsaturated nitriles are acrylonitrile and methacrylonitrile.

Illustrative cross-linking agents which are embodied in this invention are the hydrocarbon substituted silanes such as tetraallyl silane, tetramethallyl silane, tetravinyl silane, triallyl methyl silane, triallyl vinyl silane, triallyl methallyl silane, diallyl dimethyl silane, diallyl divinyl silane, diallyl dimethallyl silane, trivinyl allyl silane, trivinyl methallyl silane, divinyl dimethallyl silane, trimethallyl allyl silane, trimethallyl vinyl silane, trivinyl methyl silane, divinyl dimethyl silane, trimethallyl methyl silane, dimethallyl dimethyl silane and the like and the hydrocarbon substituted germanes such as tetraallyl germane, tetramethallyl germane, tetravinyl germane, triallyl methyl germane, triallyl vinyl germane, triallyl methallyl germane, diallyl dimethyl germane, diallyl divinyl germane, diallyl dimethallyl germane, trivinyl allyl germane, trivinyl methallyl germane, divinyl dimethallyl germane, trimethallyl allyl germane, trimethallyl vinyl germane, trivinyl methyl germane, divinyl dimethyl germane, trimethallyl methyl germane, dimethallyl dimethyl germane, and the like and the hydrocarbon substituted tin compounds such as tetraallyl tin, tetramethallyl tin, tetravinyl tin, triallyl methyl tin, triallyl vinyl tin, triallyl methallyl tin, diallyl dimethyl tin, diallyl divinyl tin, diallyl dimethallyl tin, trivinyl allyl tin, trivinyl methallyl tin, divinyl dimethallyl tin, trimethallyl allyl tin, trimethallyl vinyl tin, trivinyl methyl tin, divinyl dimethyl tin, trimethallyl methyl tin, dimethallyl dimethyl tin and the like and the hydrocarbon substituted lead compounds such as tetraallyl lead, tetramethallyl lead, tetravinyl lead, triallyl methyl lead, triallyl vinyl lead, triallyl methallyl lead, diallyl dimethyl lead, diallyl divinyl lead, diallyl dimethallyl lead, trivinyl allyl lead, trivinyl methallyl lead, divinyl dimethallyl lead, trimethallyl allyl lead, trimethallyl vinyl lead, trivinyl methyl lead, divinyl dimethyl lead, trimethallyl methyl lead, dimethallyl dimethyl lead and others.

The preferred cross-linking agents for the purpose of this invention are those having four alkenyl groups of from 2 to 4 carbon atoms per molecule because of the greater cross-linking efficiency derived therefrom. Illustrative examples of the preferred cross-linking agents for this invention are tetraallyl silane, tetravinyl silane, tetramethallyl silane, diallyl divinyl silane, dimethallyl divinyl silane, tetraallyl germane, tetravinyl germane, tetramethallyl germane, tetraallyl tin, tetravinyl tin, tetramethallyl tin, tetraallyl lead, tetravinyl lead and tetramethallyl lead. Of these the polyalkenyl silanes are more preferable because of low cost and ready availability of the halo silane intermediates.

The cross-linking agents as herein defined are made by the reaction between the alkenyl Grignard reagent and the halide of silicon, germanium, tin or lead. Tetravinyl tin, for example, is made by the reaction of approximately 5 moles of vinyl magnesium bromide with one mole of stannic chloride in diethyl ether. The mixed alkyl-alkenyl compounds are prepared by the same general procedure, for example, trivinyl methyl silane is made by treating one mole of trichloromethyl silane with approximately 4 moles of vinyl magnesium bromide in tetrahydrofuran. In this reaction allyl magnesium bromide, methallyl magnesium bromide and vinyl magnesium bromide are generally preferred over allyl magnesium chloride, methallyl magnesium chloride and vinyl magnesium chloride because the bromides are more reactive, more readily soluble in ethers and they produce greater yields of the desired product. The cross-linking agents resulting from reaction between said alkenyl Grignard reagents and halides of the element are not always pure compounds but rather are usually mixtures containing varying amounts of alkenyl groups per molecule. Analysis of such materials, therefore, reveals only the average number of alkenyl groupings on each molecule. These mixtures, however, if they are found by analysis to contain an average number of alkenyl groups of at least about 2, are capable of producing the insoluble carboxylic polymers of this invention. Since the efficiency of the cross-linking agents of this invention increases with the number of polymerizable groups on the molecule, it is much preferred to utilize cross-linking agents containing an average of two or more alkenyl groups per molecule.

The polymers of this invention can be prepared in water emulsion systems, in bulk or in solvent systems with free radical initiators. The most preferred method for preparing the polymers embodied in this invention is the aqueous emulsion or suspension system because of the high solids obtainable and the relative safety and cheapness of this type of system. The product can be isolated as a granular particle by coagulation, freeze drying, drum drying or spray drying techniques.

Polymerization in an inert organic liquid which is a solvent for the monomers but a non-solvent for the polymer, or in a mixture of such solvents, in the presence of a solvent soluble catalyst can also be employed. The polymers resulting from this polymerization technique are usually obtained as very fine, friable and often fluffy precipitates, which after solvent removal, seldom require grinding or any other further treatment before use. Suitable solvents for the latter method include, but are not limited to, benzene, xylene, tetralin, hexane, heptane, carbon tetrachloride, methyl chloride, ethyl chloride, bromotrichloro methane, and others, and mixtures of these and other solvents.

Polymerization may be carried out in the presence of a free radical catalyst in a closed vessel in an inert atmosphere and under autogenous pressure or artificially induced pressure or in an open vessel under reflux at atmospheric pressure. The temperature of the polymerization may vary from 0° C. or lower to 100° C. or higher, more preferably from 20 to 90° C., depending to a large degree on the molecular weight desired in the polymer. Polymerization under reflux at 50 to 100° C. under atmospheric pressure using a free radical catalyst is generally effective in bringing a polymer yield of 75 to 100% in less than 10 hours, usually less than 5 hours. Suitable free-radical catalysts include peroxygen compounds such as sodium, potassium and ammonium persulfates, caprylyl peroxide, benzoyl peroxide, hydrogen peroxide, pelargonyl peroxide, cumene hydroperoxides, tertiary butyl diperphthalate, tertiary butyl perbenzoate, sodium peracetate, sodium percarbonate, and the like as well as azo-bis-isobutyronitrile and the so-called "redox" type of catalyst, such as a mixture of potassium persulfate and sodium bisulfite.

The following examples will serve to illustrate the products and processes of this invention and the amounts of ingredients are given in parts by weight unless otherwise indicated and viscosities are Brookfield viscosities expressed in centipoises.

Example I

The emulsion recipe employed in the preparation of the polymers used in this and in the succeeding examples is as follows:

| | |
|---|---|
| Demineralized water _____ grams__ | 392 |
| Acrylonitrile _____ do____ | 40 |
| Polyalkenyl group 4' element _____ | Variable |
| 5% potassium persulfate solution _____ cc__ | 8 |
| 10% sodium bisulfite solution _____ cc__ | 1.5 |

A series of acrylonitrile-tetraallyl silane copolymers were prepared along with an uncross-linked polyacrylonitrile which was used as a control. Gels of all these polymers were prepared in dimethyl formamide and the viscosities were determined at various polymer concentrations.

| Percent Tetraallyl Silane in Polymer | Viscosity in Dimethyl Formamide | |
|---|---|---|
| | 3% Polymer Conc. | 5% Polymer Conc. |
| 0.1 | 5,700 | |
| 0.3 | 16,800 | 134,000 |
| 0.6 | 18,200 | 94,800 |
| 1.2 | 10,400 | |
| 5 | 6,560 | |
| 0 | 168 | 1,072 |

A small portion of the 3% dimethyl formamide gel made with the acrylonitrile-0.3% tetraallyl silane copolymer was spread on a vertical painted wood surface and was allowed to stand for a few minutes. Subsequent water flushing of the surface removed the gel and paint mixture nicely leaving the clean wood surface exposed. This same procedure was used successfully on painted metal and glass surfaces. The polymers of this example are all excellent thickeners for other non-aqueous polar solvents such as gamma-butyrolactone, N-methyl pyrrolidone, N-dimethyl acetamide and dimethyl sulfoxide. The methacrylonitrile copolymers of the above type are comparable to the acrylonitrile copolymers.

Example II

A series of acrylonitrile-tetravinyl tin copolymers were prepared by the procedure described in Example I.

| Percent Tetravinyl Tin in Polymer | Viscosity in Dimethyl Formamide, 3% Polymer Conc. |
|---|---|
| 0.3 | 1,550 |
| 0.6 | 12,200 |
| 1.2 | 44,800 |

Example III

A series of acrylonitrile-tetraallyl germanium copolymers were prepared by the procedure described in Example I.

| Percent Tetraallyl Germane in Polymer | Viscosity in Dimethyl Formamide, 3% Polymer Conc. |
|---|---|
| 0.3 | 380 |
| 0.6 | 2,252 |
| 1.2 | 57,500 |

When methacrylonitrile was substituted for acrylonitrile in this and the above examples, copolymers having comparable physical properties were obtained.

It is obvious that many changes and modifications can be made in the above-described details without departing from the nature and spirit of this invention. Therefore, it is to be understood that the invention is not limited to said details except as set forth in the appended claims.

I claim:

1. The copolymer of a nitrile selected from the group consisting of acrylonitrile and methacrylonitrile and from about 0.05 to about 5 parts by weight based on the weight of said nitrile of a cross-linking agent having the structure M—(R')$_4$ wherein R' is an alkenyl group having from 2 to 4 carbon atoms with terminal unsaturation and M is a member of the group consisting of silicon, germanium, tin and lead, said copolymer having a viscosity of at least 380 centipoises at 3% by weight concentration in dimethyl formamide.

2. The composition of claim 1 wherein M is silicon.

3. The composition of claim 1 wherein M is germanium.

4. The composition of claim 1 wherein M is tin.

5. The copolymer of acrylonitrile and from about 0.05 to about 5 parts by weight based on the weight of acrylonitrile of tetraallyl silane said copolymer having a viscosity of at least 380 centipoises at 3% by weight concentration in dimethyl formamide.

6. The copolymer of acrylonitrile and from about 0.05 to about 5 parts by weight based on the weight of acrylonitrile of tetraallyl germane said copolymer having a viscosity of at least 380 centipoises at 3% by weight concentration in dimethyl formamide.

7. The copolymer of acrylonitrile and from about 0.05 to 5 parts by weight based on the weight of acrylonitrile of tetravinyl tin said copolymer having a viscosity of at least 380 centipoises at 3% by weight concentration in dimethyl formamide.

8. The copolymer of methacrylonitrile and from about 0.05 to about 5 parts by weight based on the weight of methacrylonitrile of tetraallyl silane said copolymer having a viscosity of at least 380 centipoises at 3% by weight concentration in dimethyl formamide.

9. The copolymer of methacrylonitrile and from about 0.05 to about 5 parts by weight based on the weight of methacrylonitrile of tetravinyl tin said copolymer having a viscosity of at least 380 centipoises at 3% by weight concentration in dimethyl formamide.

10. The method for preparing a copolymer of a nitrile selected from the group consisting of acrylonitrile and methacrylonitrile and from about 0.05 to about 5 parts by weight based on the weight of said nitrile of a cross-linking agent having the structure M—(R')$_4$ wherein R' is an alkenyl group having from 2 to 4 carbon atoms with terminal unsaturation and M is a member selected from the group consisting of silicon, germanium, tin and lead said method comprising conducting the polymerization in an aqueous system at a temperature of from 20° C. to 100° C. in the presence of a free-radical initiator.

11. The method of claim 10 wherein the free-radical initiator is water-soluble.

12. The method of claim 11 wherein the free-radical initiator is a mixture of potassium persulfate and sodium bisulfite.

References Cited in the file of this patent

UNITED STATES PATENTS

| | | |
|---|---|---|
| 2,388,161 | Kropa | Oct. 30, 1945 |
| 2,550,652 | Drechsel et al. | Apr. 24, 1951 |
| 2,628,246 | MacKenzie | Feb. 10, 1953 |
| 2,671,795 | Fusch et al. | Mar. 9, 1954 |
| 2,716,638 | Cohen | Aug. 30, 1955 |
| 2,783,212 | Schnell | Feb. 26, 1957 |

OTHER REFERENCES

Bawn: "Chem. of High Polymers," Interscience Publ., N.Y. (1948), pp. 55–57.